United States Patent [19]

Menon et al.

[11] Patent Number: 5,802,344

[45] Date of Patent: Sep. 1, 1998

[54] METHOD AND APPARATUS FOR DYNAMIC SEGMENT ALLOCATION IN LOG STRUCTURED ARRAYS

[75] Inventors: Jaishankar Moothedath Menon, San Jose; Richard Lewis Mattson, Pacific Grove, both of Calif.

[73] Assignee: International Business Machines Corporation, Armonk, N.Y.

[21] Appl. No.: 552,681

[22] Filed: Nov. 3, 1995

[51] Int. Cl.$^6$ ........................................ G06F 12/00
[52] U.S. Cl. ........................ 395/492; 395/622; 395/621; 395/618; 395/439; 364/DIG. 1
[58] Field of Search .................... 395/488, 182.04, 395/441, 618

[56] References Cited

U.S. PATENT DOCUMENTS

| | | | |
|---|---|---|---|
| 5,124,987 | 6/1992 | Milligan et al. | 371/10.1 |
| 5,155,835 | 10/1992 | Belsan | 395/425 |
| 5,488,701 | 1/1996 | Brady et al. | 395/182.04 |
| 5,530,850 | 6/1996 | Ford et al. | 395/622 |
| 5,537,588 | 7/1996 | Engelmann et al. | 395/618 |
| 5,550,998 | 8/1996 | Willis et al. | 395/441 |
| 5,555,371 | 9/1996 | Duyanovich et al. | 395/182.11 |
| 5,557,770 | 9/1996 | Bhide et al. | 395/488 |

OTHER PUBLICATIONS

Rosenblum et al., "The Design and Implementation of a Log–Structured File System", 1991, Association for Computing Machinery.

*Primary Examiner*—Tod R. Swann
*Assistant Examiner*—David C. Langjahr
*Attorney, Agent, or Firm*—Baker, Maxham, Jester & Meador

[57] ABSTRACT

An array controller of a log structured array dynamically defines segments as data is taken from a write buffer and recorded into disk storage units of the log structured array such that a segment includes blocks selected from the various disk storage units at the time of segment definition so as to minimize disk arm travel. Each time a segment from the write buffer must be written to disk, the new disk segment is defined in response to current disk arm position for each disk platter in a disk storage unit. The array controller maintains a segment definition table that indicates the disk storage unit locations corresponding to each segment. In addition, garbage collection of used blocks is performed in response to disk arm idle time such that garbage collection is not performed only when there are too few empty segments. Rather, garbage collection is performed when a disk arm has been idle for a predetermined time. A variety of garbage collection schemes are described.

45 Claims, 6 Drawing Sheets

LSA Directory

| Blocks | Disks 1 2 3 4 5 |
|---|---|
| 00 | # @ D # * |
| 01 | # @ D # * |
| 02 | # @ D # * |
| 03 | # @ D # * |
| 04 | # @ D # * |
| 05 | D # # D d |
| 06 | D # # D d |
| 07 | D # # D d |
| 08 | D # # D d |
| 09 | D # # D d |
| 10 | @ d * @ D |
| 11 | @ d * @ D |
| 12 | @ d * @ D |
| 13 | @ d * @ D |
| 14 | @ d * @ D |
| 15 | * D d * @ |
| 16 | * D d * @ |
| 17 | * D d * @ |
| 18 | * D d * @ |
| 19 | * D d * @ |
| 20 | d * @ d # |
| 21 | d * @ d # |
| 22 | d * @ d # |
| 23 | d * @ d # |
| 24 | d * @ d # |

Segment Definition Table

| Segment | Disks 1 2 3 4 5 | % Clean Blocks |
|---|---|---|
| 1 | 3 1 5 3 4 | 100 |
| 2 | 1 2 2 1 5 | 100 |
| 3 | 2 4 1 2 3 | 0 |
| 4 | 4 5 3 4 1 | 100 |
| 5 | 5 3 4 5 2 | 0 |

Legend:

@ = Block in Segment 1

# = Block in Segment 2

D = Block in Segment 3

* = Block in Segment 4 d = Block in Segment 5

*FIG. 3*

LSA Directory

| Blocks | Disks |    |    |    |    |
|--------|-------|----|----|----|----|
|        | 1     | 2  | 3  | 4  | 5  |
| 00     | #     | @  | &  | #  | *  |
| 01     | #     | @  | &  | #  | *  |
| 02     | #     | @  | &  | #  | *  |
| 03     | #     | @  | &  | #  | *  |
| 04     | #     | @  | &  | #  | *  |
| 05     | &     | #  | #  | D  | d  |
| 06     | &     | #  | #  | D  | d  |
| 07     | &     | #  | #  | D  | d  |
| 08     | &     | #  | #  | D  | d  |
| 09     | &     | #  | #  | D  | d  |
| 10     | @     | &  | *  | @  | &  |
| 11     | @     | &  | *  | @  | &  |
| 12     | @     | &  | *  | @  | &  |
| 13     | @     | &  | *  | @  | &  |
| 14     | @     | &  | *  | @  | &  |
| 15     | *     | D  | d  | *  | @  |
| 16     | *     | D  | d  | *  | @  |
| 17     | *     | D  | d  | *  | @  |
| 18     | *     | D  | d  | *  | @  |
| 19     | *     | D  | d  | *  | @  |
| 20     | d     | *  | @  | &  | #  |
| 21     | d     | *  | @  | &  | #  |
| 22     | d     | *  | @  | &  | #  |
| 23     | d     | *  | @  | &  | #  |
| 24     | d     | *  | @  | &  | #  |

Segment Definition Table

| Segment | Disks |   |   |   |   | % Clean Blocks |
|---------|-------|---|---|---|---|----------------|
|         | 1     | 2 | 3 | 4 | 5 |                |
| 1       | 3     | 1 | 5 | 3 | 4 | 100            |
| 2       | 1     | 2 | 2 | 1 | 5 | 100            |
| 3       | 2     | 3 | 1 | 5 | 3 | 75             |
| 4       | 4     | 5 | 3 | 4 | 1 | 100            |
| 5       | 5     | 4 | 4 | 2 | 2 | 0              |

Legend:

@ = Block in Segment 1

# = Block in Segment 2

& = Block in Segment 3

* = Block in Segment 4 d or D = Block in Segment 5

*FIG. 4*

METHOD AND APPARATUS FOR DYNAMIC SEGMENT ALLOCATION IN LOG STRUCTURED ARRAYS

BACKGROUND OF THE INVENTION

1. Field of the Invention

This invention relates generally to data storage systems and, more particularly, to consolidation of discontinuous storage blocks in data storage systems having log structured files.

2. Description of the Related Art

A data storage system having multiple direct access storage devices (DASDs), such as disk drive units, typically stores data and other information according to an architecture that provides what is known as a log-structured array (LSA). In general, an LSA is a disk array whose storage operations are managed according to a log structured file system. In a log structured file system, data files are stored among multiple DASDs and data file changes are temporarily stored, or buffered, in an input write buffer, which is also called a memory segment. When the input write buffer is filled, the data file changes stored in the input write buffer are recorded sequentially back onto the DASDs. Thus, the data files can be said to be stored in a log-like sequential data structure. The information written back onto DASD includes data blocks, attributes, index blocks, directories, and other information used by the data storage system to manage the data operations.

Each disk drive unit includes one or more platters that are coated with magnetic material and rotate at high speed on a common spindle. Data can be stored and read from the magnetic material using a transducer such as a magnetic read/write head mounted on a disk arm that moves radially across a platter. One head and arm combination is provided for each platter and all head/arm combinations for a particular disk drive unit move across all the platters in unison. Data is recorded in concentric tracks (or alternatively in spiral tracks) on each surface of a platter having a read/write head. Each track on a disk platter is comprised of a group of radial sectors. Each sector can contain multiple byte lengths of data, called records or blocks.

Data can be stored in a variety of formats, including either a fixed block or a variable length format such as count-key-data (CKD). A fixed block format is used, for example, with the Model 0664 disk drive unit available from International Business Machines Corporation (IBM Corporation). In an LSA data storage system having disk drive units like the Model 0664 connected to a host computer, an array controller typically emulates one or more logical devices such that the physical nature of the disk drive units is transparent to the operating system and application programs using the array. That is, read and write commands generated by the host computer operating system and application programs are interpreted by the array controller so that a reference to a data file at a logical device is automatically mapped onto the appropriate physical device at a disk platter and track-sector location.

In an LSA, the recording area (tracks) available in the disk drive units is divided into consecutive areas called segment-columns. A logical segment-column of an LSA is typically the same size as a physical disk cylinder, which comprises all of the same-position tracks on all the platters of a disk drive unit. Thus, a disk drive unit in an LSA typically includes as many segment-columns as there are tracks on a single disk platter. For example, if an LSA includes five disk drive units each having five platters, then track one on each of the platters of the first disk drive unit forms a segment-column, track two on each platter of the first unit forms another segment-column, track three on each of the five platters forms another segment-column, and so forth. Similarly, track one on each platter of the second disk drive unit forms another segment-column, track two of the platters in the second unit forms another segment-column, and so forth.

The collection of disk recording area comprising corresponding segment-columns from each of the disk drive units in an LSA forms what is called a segment. For example, an LSA might use disk drive units that have a track numbering scheme wherein the first (innermost) track on each platter in a drive is designated the first track, the next track on each platter is designated the second track, and so forth. If each disk drive unit has five platters, then a segment-column is formed from the collection of track x on each of the five platters in a disk drive unit and a segment is formed from the collection of segment-column y from each disk drive unit. An LSA segment therefore would comprise all of the like-numbered tracks from each of the disk drive units in the LSA. Thus, the first segment would comprise the collection of track 1 on each platter of the first drive unit, track 1 on each platter of the second disk drive unit, and so forth through the collection of track 1 of the fifth disk drive unit. In this way, it should be apparent that an LSA typically has as many segments as there are segment-columns in a single disk drive unit.

It should be noted that many conventional multiple-platter disk drive systems number tracks sequentially from platter to platter of a disk drive unit. That is, the innermost track on the first platter is track 1, the innermost track on the second platter is track 2, and so forth. Thus, the second track on the first platter of a five-platter disk drive unit would be track 6, the second track on the second platter would be track 7, the third track on the first platter would be track 11, and so forth. As before, the first segment would comprise the collection of the innermost track on each platter (the first segment-column) from the first disk drive unit, the first segment-column from the second drive, and so forth through the fifth drive, the second segment would comprise the collection of the second segment-column from all of the disk drives, and so forth. Except for the track numbering convention, the recording area relationship between segments and segment-columns would be as described above.

One segment-column per segment in an LSA is used to store parity information that is produced from a logical exclusive-OR operation on data stored in the remaining data segment-columns of the segment. For improved performance, the segment-columns containing the parity information are not all stored on the same disk drive unit, but are rotated among the disk drive units. This ensures accurate data rebuild in the event of a disk failure, as known to those skilled in the art.

Whether an LSA stores information according to a variable length format such as a count-key-data (CKD) architecture or according to a fixed block architecture, the LSA storage format of segment-columns is mapped onto the storage space in the disk drive units so that a logical track of the LSA is stored entirely within some segment-column of some disk drive unit of the array. The size of a logical track is such that many logical tracks can be stored in the same segment-column.

The input write buffer of an LSA such as described above typically has a storage capacity of approximately one segment, so that the data in the write buffer and the parity segment-column computed from it together comprise approximately one segment's worth of information. When the input write buffer becomes substantially full, the array controller computes the parity segment-column for the data in the write buffer and writes the data and parity information into the next available empty segment in the array. That is, the first segment-column of the input write buffer is written into the first segment-column of the next available disk segment, the second segment-column of the input write buffer is written into the second segment-column of the same next disk segment, the third segment-column of the input write buffer is written into the third segment-column of the same next disk segment, and the process is repeated to the last segment-column. Writing the buffer contents into corresponding segment-columns of the same next empty disk segment avoids well-known write penalties associated with disk arm movement that otherwise would be incurred if each segment-column in the buffer were written back to its original disk location each time a new data value must be recorded. In the configuration described above, for example, if the fourth segment-column were empty, then all the disk arms of all the disk drive units would be swung to the fourth track. Writing into an empty disk segment also avoids the well-known write penalties associated with read-modify-write operations for data blocks and parity blocks in RAID-type data storage systems, which characterize most log structured arrays.

The array controller keeps track of the next available empty disk segment for data recording and consults the LSA directory to determine the proper disk arm position for the empty segment. When the input write buffer is full, the one segment's worth of data and parity information will be transferred to the next free disk segment. Therefore, when the input write buffer is to be written into the next empty disk segment, the disk arms in the disk drive units are moved to the proper positions to be at the same segment-column for recording. Recording can take place serially or in parallel so that the first segment-column from the input write buffer is recorded in the first segment-column of the next empty disk segment, the second segment-column from the input write buffer is recorded in the second segment-column of the disk segment, and so forth until all the contents of the write buffer data and the parity segment-column are recorded into the appropriate disk locations.

As the data values and parity value information (collectively referred to as data) are recorded into the disk storage locations, the new locations of the data values are maintained in the LSA directory. At each new disk segment location, the valid information corresponding to each new data value is stored. Thereafter, if a single data record or block of the data file must be changed, the new data is written into the input write buffer until one segment's worth of new data is accumulated in the write buffer. The new segment is then stored into the disk locations and the LSA directory is updated to indicate where the particular new data values may be found. In this way, write operations to the disk platters only need occur when an entire segment in the write buffer is to be recorded, rather than every time a new data value occurs. When a data value is to be retrieved from disk, the array controller consults the LSA directory to locate the data value.

Table 1 listed below shows the segment assignments for segment-columns of a data storage system having five disk drive units. The first disk drive unit is designated Disk 1, the second disk drive unit is designated Disk 2, and so forth. Table 1 shows that there are a total of five blocks per segment-column and twenty-five blocks per disk drive.

Table 1 also shows that the storage locations are divided into five segments such that the first five blocks of each disk drive unit (blocks 00 to 04) are assigned to the first segment, the next five blocks (blocks 05 to 09) are assigned to the next segment, and so forth. Blocks assigned to the first segment are represented by a "@" entry in Table 1, blocks assigned to the second segment are represented by a "#" entry, blocks assigned to the third segment are represented by a "D" entry, blocks assigned to the fourth segment are represented by a "*" entry, and blocks assigned to the fifth segment are represented by a "d" entry.

In particular, Table 1 shows that blocks 00–04 of each of the five disk drive units are assigned to segment number zero, blocks 05–09 of each of the five disk drives are assigned to segment number one, blocks 10–14 of the five disk drives are assigned to segment number two, blocks 15–19 of the five disk drives are assigned to segment number three, and blocks 20–24 of the five disk drives are assigned to segment number four. Thus, the first five blocks on the first disk drive correspond to a segment-column, the second five blocks on the first disk drive correspond to another segment-column, and so forth.

TABLE 1

| Segments | Blocks | Disks | | | | |
| | | 1 | 2 | 3 | 4 | 5 |
| --- | --- | --- | --- | --- | --- | --- |
| 0 | 00 | @ | @ | @ | @ | @ |
|   | 01 | @ | @ | @ | @ | @ |
|   | 02 | @ | @ | @ | @ | @ |
|   | 03 | @ | @ | @ | @ | @ |
|   | 04 | @ | @ | @ | @ | @ |
| 1 | 05 | # | # | # | # | # |
|   | 06 | # | # | # | # | # |
|   | 07 | # | # | # | # | # |
|   | 08 | # | # | # | # | # |
|   | 09 | # | # | # | # | # |
| 2 | 10 | D | D | D | D | D |
|   | 11 | D | D | D | D | D |
|   | 12 | D | D | D | D | D |
|   | 13 | D | D | D | D | D |
|   | 14 | D | D | D | D | D |
| 3 | 15 | * | * | * | * | * |
|   | 16 | * | * | * | * | * |
|   | 17 | * | * | * | * | * |
|   | 18 | * | * | * | * | * |
|   | 19 | * | * | * | * | * |
| 4 | 20 | d | d | d | d | d |
|   | 21 | d | d | d | d | d |
|   | 22 | d | d | d | d | d |
|   | 23 | d | d | d | d | d |
|   | 24 | d | d | d | d | d |

It should be understood that, in an actual data storage system, there typically will be many more disk drive units, platters, blocks, and segments than are illustrated in Table 1. The exemplary values given here are for purposes of illustration only. In Table 1, the disk blocks corresponding to the different segments are designated with different characters for purposes of illustration. Those skilled in the art will understand that an LSA directory actually will include a designation or identification of the data (or lack thereof) that is contained in each storage block, as described further below.

A block that contains data values for which there have been later write operations, meaning that the data values have been superseded, is available for recording new data. Such superseded data is referred to as garbage (or "dead") and the corresponding disk area is referred to as a garbage block or garbage segment-column. A block containing data values that have not been superseded contains valid data and is referred to as a clean block or a live block. After a number of data modifying write operations have been carried out in disk drive units forming a log structured array, there likely will be at least one segment's worth of garbage blocks scattered throughout the array. A fully empty segment, which is available for receiving new (live) data values from the input write buffer, can be created by gathering these scattered garbage blocks together.

Creating empty segments is important because, for a controller in an LSA to continue write operations as new data values are received from the input write buffer, new empty segments in the disk drive units must be produced continually. New empty segments are typically produced by identifying clean blocks from segments containing live data and consolidating the live data from these segments in a smaller number of full segments. Such consolidation creates one or more segments that contain only garbage blocks. A segment that is entirely garbage is therefore empty and is available for recording one segment's worth of data from the write buffer, as described above. The process of consolidating non-contiguous clean blocks so as to consolidate live data and form empty segments is called garbage collection.

Garbage collection is usually done by first locating a target segment having the fewest number of live data blocks (and therefore the largest number of garbage blocks) in a disk drive unit of the log structured array. The live data values of the target segment are read into a temporary storage buffer. Another target segment is then identified and the live data from that target segment is read into the temporary storage buffer. The process of locating target segments and reading their live data blocks into the temporary storage buffer is repeated segment by segment until the buffer is full. Typically, several target segments must be processed before the buffer will be full. After the temporary storage buffer becomes full, the data from the buffer is recorded back into an empty segment in the disk storage array. As garbage collection proceeds, live data from the various target segments is read into the temporary storage buffer, the buffer fills up, and the live data is stored back into an empty segment of the array. After the live data values in the temporary storage buffer are written into the array, the segments from which the live data values were read are designated empty. In this way, live data is consolidated and new empty segments are produced. Typically, garbage collection is performed when the number of empty segments in the disk array drops below a predetermined threshold value.

A potential problem with the garbage collection process is that the disk arm on every disk platter in a segment must be moved away from its respective current position and halt other activities (such as retrieving data for a read operation) to do the garbage collection. Typically, the array controller will interrupt disk operations to perform garbage collection as soon as the number of empty segments drops below the threshold value. If any disk drive unit of a segment is being heavily utilized by data processing operations, the process of garbage collection will hamper the disk drive unit from timely completing such operations. In this way, garbage collection represents overhead that decreases the available time for other disk data operations.

From the discussion above, it should be apparent that there is a need for a storage system that more efficiently performs garbage collection in a log structured array. The present invention satisfies this need.

SUMMARY OF THE INVENTION

In accordance with the invention, an array controller of a log structured array (LSA) dynamically defines segments within the LSA as data is read and recorded from the disk drive storage units of the array such that a segment includes blocks selected from the various drive units at the time of segment definition so as to minimize disk arm travel. The array controller maintains a data structure called a segment definition table that dynamically indicates the disk drive storage unit locations corresponding to each LSA segment. A dynamic segment definition scheme in accordance with the invention reduces the amount of disk arm movement necessary to store data into a new segment and thereby reduces disk overhead.

In one aspect of the invention, when a new segment must be written to, the segment is defined in response to current disk arm position for each drive unit of the array. For example, the segment-columns that comprise a segment can be selected so as to include, for each disk drive unit in the array, the empty segment-column nearest the current disk arm position in a disk drive unit. Alternatively, the segment can be defined to include the segment-columns that are located within a predetermined distance of the current disk arm position.

In another aspect of the invention, garbage collection is performed in response to disk arm idle time and in place of, or in addition to, being performed when the number of empty segments falls below a garbage collection threshold number. Thus, garbage collection can be performed in a particular segment-column when the corresponding disk arm has been idle for a predetermined time. That is, when a disk arm has been idle, it can perform garbage collection on a segment-column independently of what the other disk arms in the storage unit segment are doing. In this way, garbage collection can be performed on an opportunistic basis, disk drive unit by disk drive unit, rather than segment by segment. This further reduces overhead in disk operations.

Other features and advantages of the present invention should be apparent from the following description of the preferred embodiment, which illustrates, by way of example, the principles of the invention.

BRIEF DESCRIPTION OF THE DRAWINGS

FIG. 3 is a representation of a directory and segment definition table of the data storage system illustrated in FIG. 1.

FIG. 4 is a representation of the directory and segment definition table of FIG. 3 after an update operation.

DESCRIPTION OF THE PREFERRED EMBODIMENT

Figure 1:
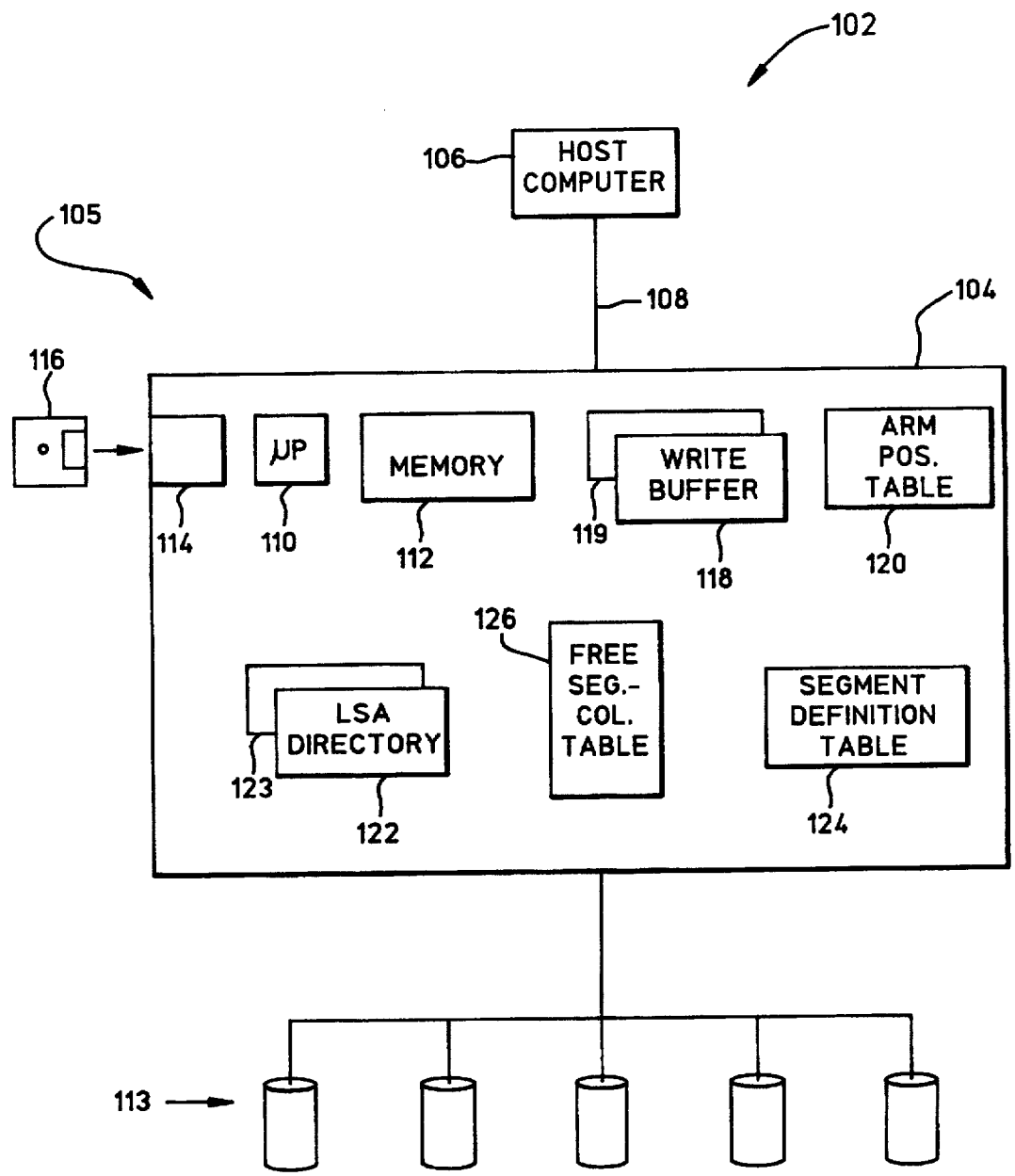
FIG. 1 is a block diagram of a computer system that includes a data storage system with an array controller constructed in accordance with the present invention.

FIG. 1 illustrates a computer system 102 having an array controller 104 of a data storage system 105 constructed in accordance with the present invention. The array controller communicates with a host computer 106 over a data bus 108. The data bus may comprise, for example, an industry standard Small Computer System Interface (SCSI) communication interface, a "Microchannel" communications bus such as provided by the International Business Machines Corporation (IBM Corporation), or the like. Commands for data recording and retrieval are received by the array controller 104 and are executed by an array controller microprocessor 110. The microprocessor executes instructions stored in a program storage portion of a memory 112. In accordance with the program storage of the memory, the array controller 104 records into and retrieves data from a plurality of disk drive storage units 113. The array controller constructed in accordance with the present invention dynamically defines log structured array segments as they are needed according to the current location of disk arms in each of the disk drive units 113 of the array 105 at the time new data values are to be stored.

Figure 2:
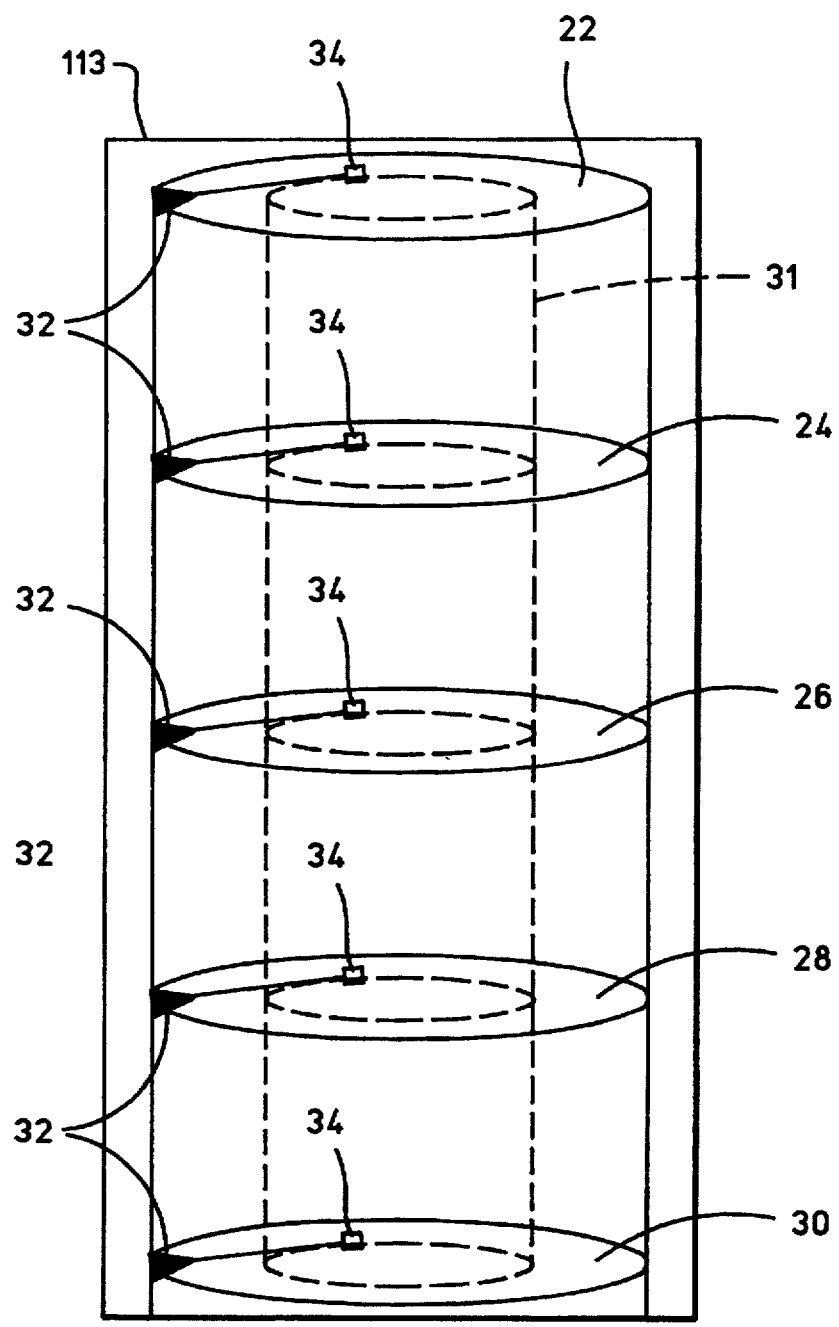
FIG. 2 is a representation of a log structured disk drive unit of the data storage system illustrated in FIG. 1.

FIG. 2 represents a single one of the disk drive units 113 having five disk platters 22, 24, 26, 28, and 30. Data is recorded in concentric tracks (or alternatively in spiral tracks) on one or both surfaces of each platter. Each track on a disk platter is comprised of a group of radial sectors, also called blocks. Each block can contain multiple byte lengths of data, called records. Data is stored in the array according to a log structured file format so that a logical segment-column of the array is the collection of all the same-numbered tracks on all the platters of a single disk drive unit. Thus, each disk drive unit 113 includes as many segment-columns as there are tracks on a single disk platter. A segment-column is graphically represented in FIG. 2 by the dashed line 31 that extends across each of the disk platters. The collection of one segment-column on each of the five disk drive units 113 shown in FIG. 1 defines a segment. Data is stored into a segment-column (recorded onto the platters) by disk arms 32 having magnetic heads 34. One disk arm is depicted in FIG. 2 for each recording surface of a platter. If desired, the platters can be double-sided.

An exemplary segment definition is illustrated in the LSA Directory and corresponding Segment Definition Table representations of FIG. 3. In the exemplary configuration, each LSA segment comprises twenty-five blocks of storage, the twenty-five blocks distributed among the platters of each disk drive unit such that one block is recorded per track, with five tracks per platter. As described above, the collection of the same radial position track (block) on each platter of a disk drive unit comprises one segment-column, and the collection of one segment-column from each of the disk drive units comprises one segment. Because data is stored in the disk drive units illustrated in FIG. 1 according to a log structured array, the blocks are stored sequentially. For example, block 00 of the LSA could correspond to the first track of the first platter 22 of disk drive unit number 1 (Disk 1), block 01 of the LSA could correspond to the first track of the second platter 24 of Disk 1, block 02 could correspond to the first track of the third platter 26 of Disk 1, block 03 could correspond to the first track of the fourth platter 28, and block 04 could correspond to the first track of the fifth platter 30. Thus, blocks 00 through 04 of Disk 1 would comprise one segment-column of the LSA.

In a similar fashion, blocks 00 through 04 of a second disk drive unit (Disk 2) could correspond to one track on each of the five platters of Disk 2 and would comprise one LSA segment-column, blocks 00 through 04 of a third disk drive unit could comprise another segment-column, and so forth. With the specified configuration, in which blocks 00 through 04 comprise a first segment-column, those skilled in the art will appreciate that blocks 05 through 09 represent a second collection of like-positioned tracks on each of the platters in a disk drive unit of the storage array 105 and comprise another segment-column. Thus, blocks 05 through 09 of Disk 1 comprise a second segment-column, blocks 10 through 14 comprise a third segment-column, blocks 15 through 19 comprise a fourth segment-column, and blocks 20 through 24 comprise a fifth segment-column. As noted above, the collection of one segment-column from each of the disk drive units comprises a segment.

The segment configuration of the storage array is indicated in the FIG. 3 Segment Definition Table, which shows the collection of segment-columns that comprise each one of the segments. For example, the Segment Definition Table indicates that the first segment is comprised of the third segment-column of the first disk drive unit (Disk 1) of the array 113, the first segment-column of the second disk drive unit (Disk 2), the fifth segment-column of the third disk drive unit (Disk 3), the third segment-column of the fourth disk drive unit (Disk 4), and the fourth segment-column of the fifth disk drive unit (Disk 5). Comparing the Segment Definition Table for Segment 1 with the LSA Directory, it should be understood that the third segment-column of Disk 1 comprises blocks 10 through 14 of Disk 1. Similarly, it should be understood that the first segment-column of Disk 2 comprises blocks 00–04 of Disk 2, the fifth segment-column of Disk 3 comprises blocks 20–24 of Disk 3, the third segment-column of Disk 4 comprises blocks 10–14 of Disk 4, and the fourth segment-column of Disk 5 comprises blocks 15–19 of Disk 5. A similar correspondence can be made between the other segment entries in the Segment Definition Table and the blocks in the LSA Directory.

Returning to FIG. 1, program instructions can be loaded into the program storage of the memory 112 of the array controller 104 through an optional program storage reader 114 of the array controller or through a network connection that interfaces with the data bus 108. The program storage reader permits a program product storage device 116, such as a magnetic disk, to be received and for program steps recorded on the program product storage device to be read and transferred into the array controller memory 112. In this way, the array controller processing steps necessary for performance in accordance with the invention can be embodied on a program product such as the program product storage device 116. Other suitable storage devices can include magnetic tape, optical disk, and semiconductor memory. Alternatively, the program steps can be received into the memory 112 through the network connection.

When the array controller 104 receives data from the host computer 106, the microprocessor controller 110 temporarily stores the data into a write buffer 118. The microprocessor controller maintains data in the write buffer in accordance with the log structured array format. That is, the write buffer is organized into segment-columns, blocks, and segments. Preferably, where a segment-column can be stored completely in a single disk drive unit, the write buffer includes at least as many segment-columns as there are disk drive units. In the preferred embodiment, the array controller 104 includes a duplicate write buffer 119 that is used in case of failure of the primary write buffer 118. All write operations into the primary write buffer 118 also are performed on the duplicate write buffer 119. In this way, an extra measure of reliability is provided.

When a predetermined amount of the write buffer 118 is filled with data, the microprocessor controller 110 causes one segment's worth of data to be transferred from the write buffer into a segment of the disk drive units 113. The predetermined amount can be one segment's worth of the write buffer or can be a predetermined portion of the write buffer capacity. If the write buffer has a capacity of two segments, for example, a typical predetermined threshold amount might be when the write buffer is one-half full. A threshold value of one segment has been found to provide satisfactory performance, but is an exemplary value for purposes of illustration only. The particular threshold value selected will depend on the buffer capacity, system operating characteristics, and desired performance of the particular implementation. Those skilled in the art will be able to select the predetermined threshold without further explanation.

When a segment of data from the write buffer 118 is to be written into the disk drive units 113, the microprocessor controller 110 dynamically defines a new segment in accordance with the current position of the disk arms in each of the disk drive units. In the preferred embodiment, the current disk arm positions are obtained from an arm position table 120 maintained in the array controller 104. The arm position table entries provide, for each disk drive unit, the disk track over which the arms of that disk are positioned. Alternatively, the disk arm positions can be obtained upon the controller polling a disk drive device for the arm position. The manner in which the controller defines the new segment shall be described in greater detail below.

When the data is recorded into the disk drive units 113, the microprocessor controller 110 updates the contents of an LSA directory 122 that contains a listing of each segment-column and the corresponding data stored there. In the preferred embodiment, a duplicate LSA directory 123 is included in the array controller so that the duplicate directory can be used if the primary LSA directory fails. Every write operation performed on the primary LSA directory also is performed on the secondary LSA directory. Again, this provides an extra measure of reliability. When the LSA directory 122 is updated, the microprocessor controller also updates a segment definition table 124, such as illustrated in FIG. 1.

When the microprocessor controller 110 is to define a new segment, it consults a table of free segment-columns 126 and compares the free segment data table against the arm position table 120 to locate the free segment-column closest to the current arm position for each disk arm in a disk drive unit 113. The free segment-column table 126 is maintained by the controller and includes a list of free segment-columns. In this way, the new segment being dynamically defined will consist of those free segment-columns nearest to each present location of the respective disk arms. This permits the new segment to be defined and the data from the write buffer 118 to be stored into the disk drive units with the minimal amount of disk arm movement.

The advantage of dynamic segment definition will be better understood with an example, as illustrated in FIG. 4. As noted above, when a one-segment group of blocks in the write buffer 118 is ready to be moved out to the disk drive units 113, the microprocessor controller 110 will locate an empty segment among the disk drive units. With reference to the tables illustrated in FIGS. 3 and 4, for purposes of example, assume that the segment-columns marked "D" and "d" contain all dirty blocks and therefore are empty segment-columns. Therefore, the Segment Definition Table of FIG. 3 shows that Segment 3 and Segment 5 have 0% clean blocks.

In the case of a fixed segment configuration, such as was illustrated in Table 1 above, all twenty-five blocks that are to be written from the write buffer to the segment in the disk drive units would have to be written into either segment number three or segment number five. Writing into either segment three or five will require all of the disk arms to be moved from their present locations to the respective segment-column locations, either Segment 3 or Segment 5.

In contrast, the dynamic segment definition in accordance with the present invention permits the twenty-five blocks in the write buffer segment to be written to segment-columns from either segment number three or segment number five, whichever is closer to the present arm position. Dynamic segment definition therefore requires less time, forming a new segment three and a new empty segment five. The Segment Definition Table in FIG. 4 is provided based on a hypothesized disk arm location for each disk arm. To perform the new segment definition, all that is required is to change the segment definition table entries, as illustrated in FIG. 4.

Thus, by comparing FIG. 3 and FIG. 4, it should be apparent that segment number one, segment number two, and segment number four are unchanged. It also should be apparent that the definition of segment number three has been changed from FIG. 3 to FIG. 4 so that in FIG. 4 it comprises the second segment-column from Disk 1, the third segment-column from Disk 2, the first segment-column from Disk 3, the fifth segment-column from Disk 4, and the third segment-column from Disk 5. The segment-columns from Disk 2 and Disk 4 for the third segment have been changed from the prior segment definition in FIG. 3 because the disk arm for these two disk drives were closest to the respective empty segment-columns. The percentage of clean blocks indicated in the Segment Definition Table for FIG. 4 is arbitrarily set to a non-zero value for purposes of illustration.

Similarly, it should be apparent that the definition for segment number five has been changed so it comprises the fifth segment-column from Disk 1, the fourth segment-column from Disk 2, the fourth segment-column from Disk 3, the second segment-column from Disk 4, and the second segment-column from Disk 5. The percentage of clean blocks for the fifth segment is illustrated as zero.

Figure 5:
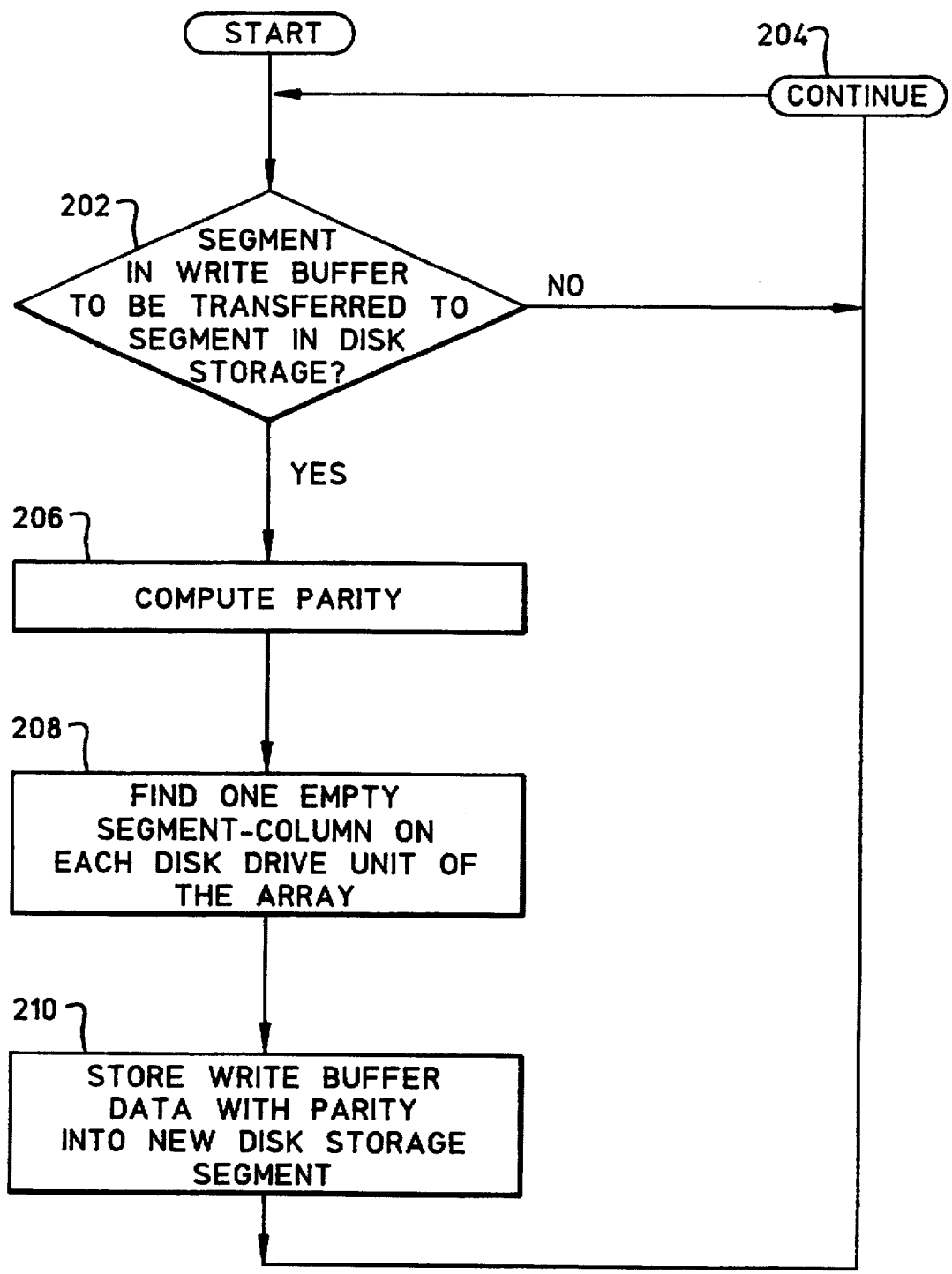
FIG. 5 is a flow diagram that illustrates the operating steps executed by the array controller illustrated in FIG. 1 in carrying out dynamic segment definition.

The operation of the disk array controller can be further understood with reference to the flow diagram of FIG. 5, which represents the processing steps carried out by the array controller 104. In the first step, represented by the decision block numbered 202, the controller checks to determine if there is a segment in the write buffer that is to be transferred to a segment in the disk storage array. If there is no segment ready for transfer, then the array controller continues with further operations, as represented by the continue box numbered 204, and continues to check for segments in the write buffer.

If a segment in the write buffer is ready to be transferred to a segment in the disk storage array, an affirmative decision outcome at the decision box numbered 202, then the controller computes a parity value for the data in the write buffer. The parity computation step is represented by the flow diagram box numbered 206. It should be understood that the parity computation step could alternatively occur at an earlier or later time than illustrated in FIG. 5 without departing from the teachings of the invention. The data values from the write buffer and the parity data computed from those values will be collectively referred to as the write buffer data.

In the exemplary processing, before the controller can move the segment comprising the write buffer data into the disk storage array, the controller dynamically defines a new disk segment. To define a new disk segment, the controller finds one empty segment-column on each disk unit of the storage array, as represented by the FIG. 5 flow diagram box numbered 208. In the preferred embodiment, the empty segment-columns are selected independently from disk unit to disk unit according to the distance of the segment-column from the current disk arm position for each disk unit. As noted above, the disk arm position is determined from the disk arm position table or, alternatively, upon polling each disk unit.

In the preferred embodiment, the processing represented by the flow diagram box numbered 208 selects the segment-column that is nearest the current disk arm position. The processing to determine the closest segment-column is a simple comparison by the controller of the track over which the disk arm is positioned, as described above, with the track (block) location specified in the LSA directory. The disk segment to which the write buffer data will be written can be defined in ways other than that recited above. The processing represented by the flow diagram box numbered 208 can comprise, for example, selecting empty segment-columns that are located within a predetermined number of segment-columns from the current disk arm position. Such selection can be used in conjunction with other considerations, if desired. With either segment-column selection scheme, a segment does not necessarily comprise all like-numbered segment-columns from each of the disk units, but can be selected independently from disk unit to disk unit.

After all of the disk units have been processed so that an entirely new disk segment has been defined, processing moves to the flow diagram box numbered 210, which shows that the write buffer data is written into the newly defined segment in the disk array. Processing then continues back to the continuation box numbered 204, where the LSA write buffer is checked for additional data to be transferred to disk.

In another aspect of the computer system illustrated in FIG. 1, garbage collection is performed when individual disk arms have been idle for a predetermined time. In this way, when a disk arm is idle, it can perform garbage collection on a segment-column independently of the activities performed by the other disk arms. Conventionally, garbage collection is performed when the number of empty segments in the disk array falls below a predetermined threshold value. When this occurs, the activities of the disk arms is taken over by the disk array controller to perform the garbage collection. This can cause an inopportune interruption in data processing operations.

In accordance with the invention, garbage collection as a function of disk arm idle time comprises an opportunistic scheme for more efficient garbage collection. Such opportunistic garbage collection can be performed in place of, or in addition to, performing garbage collection as a function of the number of empty segments. The amount of idle time that can pass before a disk arm will be controlled by the array controller for garbage collection will depend on the implementation of a particular computer system and will depend on the performance parameters desired. Those skilled in the art should be able to select an idle time threshold value without further explanation.

In addition to instituting garbage collection according to disk arm idle time, the process steps performed during garbage collection can be implemented according to one of several schemes. In the preferred embodiment, these schemes are designed to further increase operating efficiency.

Figure 6:
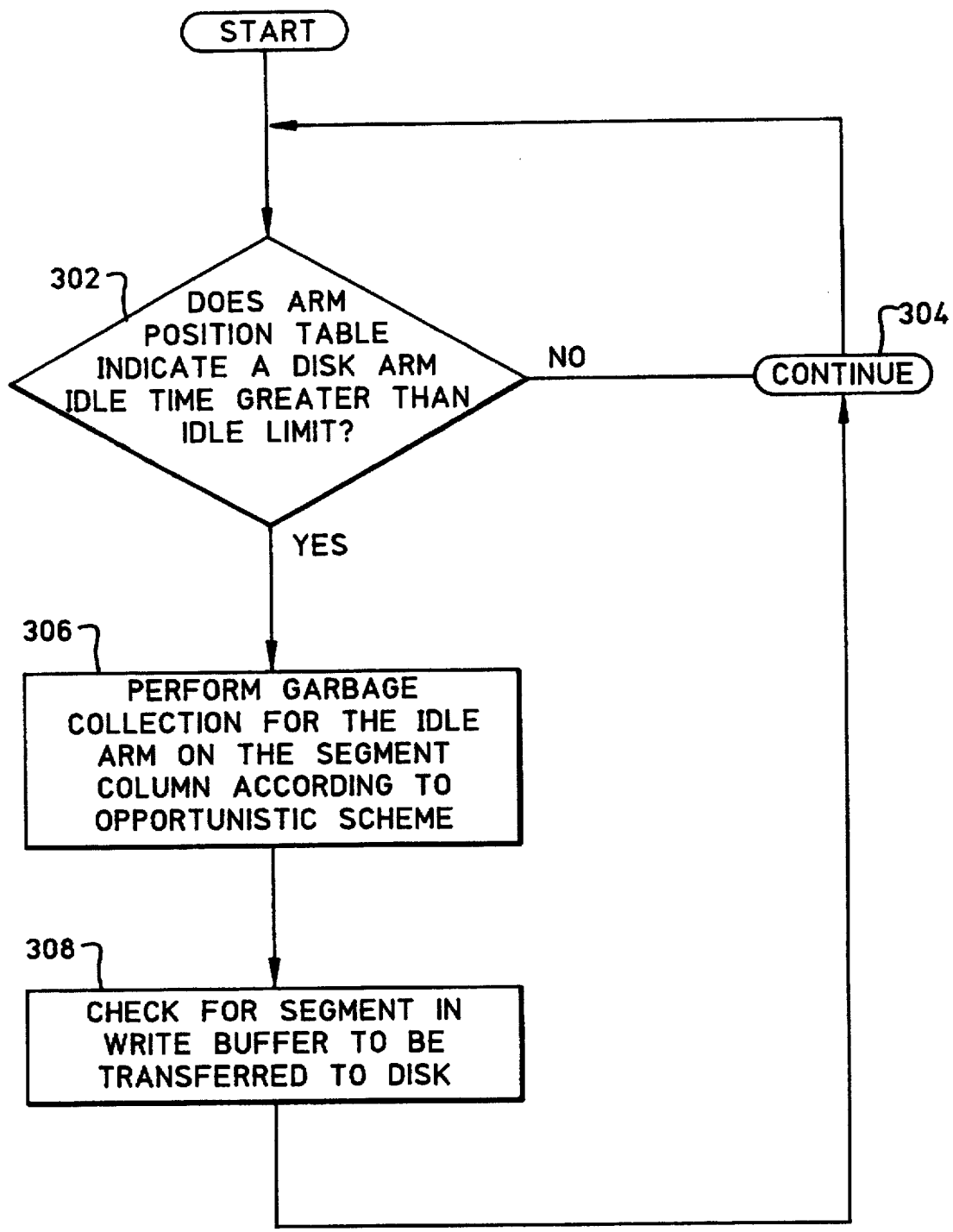
FIG. 6 is a flow diagram that illustrates the operating steps carried out by the array controller illustrated in FIG. 1 in carrying out opportunistic garbage collection.

The processing steps generally followed by the array controller in performing garbage collection will be better understood with reference to the flow diagram of FIG. 6. The first step in garbage collection is for the controller to determine if the arm position table indicates that a disk arm idle time is greater than a predetermined idle time limit, as represented by the decision box numbered 302. A negative outcome indicates that computer system processing should continue, as represented by the continuation box numbered 304. If a disk arm has been idle for greater than the limit value, an affirmative outcome from the decision box 302, then the controller performs garbage collection for the idle arm on a segment-column according to one of the opportunistic schemes described below. This step is represented by the flow diagram box numbered 306.

After garbage collection, an optional step in accordance with the invention is to check for a segment in the write buffer that is ready to be transferred to disk storage, as represented by the flow diagram box numbered 308. It should be clear that the processing steps involved in the box numbered 308 correspond to the processing steps illustrated in FIG. 5 and described in the accompanying text. Following the garbage collection and the (optional) segment writing, data processing operations continue, as represented by the continuation box numbered 304.

In a first alternative, the garbage collection step represented by the flow diagram box numbered 306 can be implemented by a scheme that performs as follows:

If the idle disk arm is currently located on a segment-column i (or is located within a predetermined number of segment-columns of i), which is part of a segment number k, and if that segment k has less than a predetermined percentage P1 of live data blocks, then garbage collection will be performed to collect the live data blocks from segment-column i, assuming there are live data blocks to collect.

In an alternative scheme, the processing step represented by the flow diagram box numbered 306 comprises:

If the idle disk arm is currently located on a segment-column i (or is located within a predetermined number of segment-columns of i) and if the segment-column i has less than a predetermined percentage P2 of live data blocks, then garbage collection is performed to collect live data blocks from the segment-column i, assuming there are any.

Another garbage collection scheme represented by the flow diagram box numbered 306 can comprise the step of:

If the idle disk arm is currently located on a segment-column i (or is located within a predetermined number of segment-columns of i), which is part of a segment number k, and if that segment number k has less than a predetermined percentage P1 of live data blocks, and if the segment-column i on the disk has less than a predetermined percentage P2 of live data blocks, then garbage collection is performed to collect live data blocks from the segment-column i, assuming there are any.

Yet another alternative garbage collection scheme represented by the flow diagram box numbered 306 comprises the step of:

If the idle disk arm is currently located on a segment-column i and if a segment-column j on that same disk, which belongs to a segment number n having less than a predetermined percentage P1 of live data blocks, is the closest segment-column that is less than a predetermined number m of segment-columns away, and if the segment-column j has less than a predetermined percentage P2 of live data blocks, then the idle disk arm is moved from the segment-column i to the segment-column j and garbage collection is performed to collect live data blocks from the segment-column j.

Finally, another alternative garbage collection scheme represented by the flow diagram box numbered 306 comprises doing garbage collection based on emptiness, not on location. That is, largely empty segments are located and, because only one segment-column on a disk will be a member of a given segment, garbage collection can proceed on identified segment-columns. Thus, garbage collection would comprise the steps of:

Locating the segment number n having the largest number of garbage blocks, moving the idle disk arm to the corresponding segment-column i that is part of the segment n, and proceeding with garbage collection in that segment-column.

It should be understood that, for each of the schemes described above, garbage collection is not performed if the recited conditions are not satisfied.

Garbage collection can be further modified from the conventional schemes by initiating it in response to the number of empty segments in the array. That is, the controller need not wait for a disk drive unit to become idle before performing garbage collection on that disk. Rather, garbage collection could be initiated when the number of empty segments falls below a predetermined value. Garbage collection could then proceed as described above, segment-column by segment-column.

The computer system described above implements dynamic segment definition so as to minimize the amount of disk arm travel necessary to provide clean segments in disk storage. The computer system described above advantageously includes one of several opportunistic garbage collection schemes so that, in addition to minimizing disk arm travel, efficiency is further increased by performing garbage collection whenever a particular disk arm has remained idle. In this way, the amount of garbage collection processing that interrupts other data processing operations is reduced.

The present invention has been described above in terms of a presently preferred embodiment so that an understanding of the present invention can be conveyed. There are, however, many configurations for storage subsystems and array controllers not specifically described herein but with which the present invention is applicable. The present invention should therefore not be seen as limited to the particular embodiment described herein, but rather, it should be understood that the present invention has wide applicability with respect to storage subsystems and array controllers generally. All modifications, variations, or equivalent arrangements that are within the scope of the attached claims should therefore be considered to be within the scope of the invention.

We claim:

1. An array controller that records data into segments of storage locations in a plurality of disk drive storage devices organized as a log structured array having segment-columns, each storage device having one or more disk platters, the array controller comprising:

a write buffer in which data received from a host computer for recording into the storage locations of the disk drive storage devices is temporarily stored;

a log structured array (LSA) directory containing disk locations that define segments of the disk drive storage devices comprising log structured array segments;

a segment definition table that contains a storage device location definition for each segment of the LSA directory; and a control processor that dynamically modifies the segment definition table so as to define a new segment into which data is recorded by selecting sufficient segment-columns independently from each disk drive storage device of the array to define a new segment, and maintains the segment definition table accordingly.

2. An array controller as defined in claim 1, wherein the control processor selects a segment-column nearest a current arm position of a disk arm in each disk drive storage device to define a new segment.

3. An array controller as defined in claim 1, wherein the control processor selects a segment-column that is located within a predetermined relative distance from a current arm position of a disk arm in each disk drive storage device to define a new segment.

4. An array controller as defined in claim 3, wherein the control processor performs a garbage collection process by moving live data blocks of segment-columns in a target segment to a temporary storage buffer, wherein a live data block corresponding to the current arm position is moved if the current arm position indicates that the disk arm has been idle for a time greater than a predetermined idle threshold time.

5. An array controller as defined in claim 4, wherein the control processor further performs the garbage collection process if the disk arm that has been idle for a time greater than the predetermined idle threshold time is located on a segment-column that is part of a segment having less than a predetermined percentage of live data blocks.

6. An array controller as defined in claim 4, wherein the control processor further performs the garbage collection process if the disk arm that has been idle for a time greater than the predetermined idle threshold time is located on a segment-column that has less than a predetermined percentage of live data blocks.

7. An array controller as defined in claim 4, wherein the control processor further performs the garbage collection process if the disk arm that has been idle for a time greater than the predetermined idle threshold time is located on a segment-column that is part of a segment having less than a predetermined first percentage of live data blocks; and if the disk arm is located on a segment-column that has less than a predetermined second percentage of live data blocks.

8. An array controller as defined in claim 4, wherein the control processor further performs the garbage collection process if the disk arm that has been idle for a time greater than the predetermined idle threshold time is located on a first segment-column of a first segment having less than a predetermined first percentage of live data blocks, and if a second segment-column on that same disk is the closest segment-column less than a predetermined number of segment-columns away, and if the second segment-column has less than a predetermined second percentage of live data blocks, wherein the live data blocks are moved from the second segment-column.

9. An array controller as defined in claim 4, wherein the control processor further performs the garbage collection process by locating the segment number having the largest number of empty blocks, moving the idle disk arm to the corresponding segment-column, and proceeding with garbage collection in that segment-column.

10. An array controller as defined in claim 1, wherein the control processor performs a garbage collection process by moving live data blocks of segment-columns in the target segment to a temporary storage buffer, wherein the array controller moves the disk arm to a target segment-column from a present location and moves the corresponding live data blocks if the target segment-column has less than a predetermined percentage of live data blocks and if the present location of the disk arm is less than a predetermined number of segment-columns from the target segment-column.

11. An array controller as defined in claim 1, further including:
an arm position table containing disk arm position data that indicates current relative disk position for a disk arm of each disk drive storage device.

12. An array controller as defined in claim 1, wherein the control processor performs a garbage collection process by moving live data blocks of segment-columns in a target segment to a temporary storage buffer, wherein the live data blocks are moved from the target segment-column if the number of empty segments in the log structured array falls below a predetermined number.

13. A method of storing data as segments in a log structured array having a plurality of data storage devices in response to requests received from a host computer for data read and write operations into the data storage devices, the method comprising the steps of:
recording data received from the host computer into a write buffer;
determining disk arm position data that indicates position of a disk arm in each data storage device;
maintaining a log structured array (LSA) directory data structure that contains disk locations that define segments of the data storage devices comprising log structured array segments;
recording data in the write buffer into segments of the data storage devices when the write buffer becomes full, such that the segments into which data is written are dynamically defined according to which segment-columns are nearest to a present disk arm position; and
maintaining a segment definition table that indicates a data storage device location corresponding to the segment-columns that define each segment.

14. A method of storing data as defined in claim 13, wherein the step of recording data into segments of the data storage devices comprises selecting a segment-column for recording according to the segment-column nearest a current disk arm position of each data storage device to form a new segment.

15. A method of storing data as defined in claim 13, further including the step of performing garbage collection by moving live data blocks of segment-columns in a target segment to a temporary storage buffer, wherein a live data block corresponding to a current arm position is moved if the disk arm position data indicates that the disk arm has been idle for a time greater than a predetermined idle threshold time.

16. A method of storing data as defined in claim 15, wherein the step of garbage collection is performed if the disk arm that has been idle for a time greater than the predetermined idle threshold time is located on a segment-column that is part of a segment having less than a predetermined percentage of live data blocks.

17. A method of storing data as defined in claim 15, wherein the step of garbage collection is performed if the disk arm that has been idle for a time greater than the predetermined idle threshold time is located on a segment-column that has less than a predetermined percentage of live data blocks.

18. A method of storing data as defined in claim 15, wherein the step of garbage collection is performed if the disk arm that has been idle for a time greater than the predetermined idle threshold time is located on a segment-column that is part of a segment having less than a predetermined first percentage of live data blocks; and if the disk arm position data indicates the disk arm is located on a segment-column that has less than a predetermined second percentage of live data blocks.

19. A method of storing data as defined in claim 15, wherein the step of garbage collection is performed if a disk arm that has been idle for a time greater than the predetermined idle threshold time is located on a first segment-column of a first segment having less than a predetermined first percentage of live data blocks, and if a second segment-column on that same disk is the closest segment-column less than a predetermined number of segment-columns away, and if the second segment-column has less than a predetermined second percentage of live data blocks, wherein the live data blocks are moved from the second segment-column.

20. A method of storing data as defined in claim 15, wherein the step of garbage collection is performed by locating the segment having the largest number of empty blocks, moving the idle disk arm to the corresponding segment-column, and proceeding with garbage collection in that segment-column.

21. A method of storing data as defined in claim 15, wherein the step of garbage collection is performed if the number of empty segments in the array is below a threshold empty segment number.

22. A method of storing data as defined in claim 13, further including the step of performing a garbage collection process to free up an entire target segment by moving live data blocks of segment-columns in the target segment to a temporary storage buffer, wherein the controller moves the disk arm to the target segment-column from a present location and moves the live data blocks from the target segment-column if the target segment-column has less than a predetermined number of live data blocks and if the present location of the disk arm is less than a predetermined number of segment-columns from the target segment-column and has less than a predetermined number of live data blocks.

23. A method of storing data as defined in claim 13, further including the step of performing a garbage collection process to free up an entire target segment by moving live data blocks of segment-columns in the target segment to a temporary storage buffer, wherein the controller moves the live data blocks from the target segment-column if the number of empty segments in the log structured array falls below a predetermined number.

24. A data storage system that communicates with a host computer that generates requests for data read and write operations, the data storage system comprising:
a plurality of disk drive storage devices having one or more platters, each of which includes storage locations in which data is stored by a disk arm;
a write buffer in which data received from the host computer for writing into the data storage devices is temporarily stored;
a log structured array (LSA) directory containing disk storage locations that define segments of the disk drive storage devices comprising log structured array segments;
a segment definition table containing a location definition for each segment of the LSA directory; and
a control processor that controls the storing of data in the disk drive storage devices such that the control processor dynamically defines a new segment into which data is recorded by selecting a segment-column independently from each disk drive storage device and maintains a segment definition table containing storage locations in the disk drive storage devices corresponding to the segment-columns that define each segment.

25. A data storage system as defined in claim 24, wherein the control processor selects a segment-column nearest a current arm position of a disk arm in each disk drive storage device to define a new segment.

26. A data storage system as defined in claim 24, wherein the control processor selects a segment-column that is located within a predetermined relative distance from a current arm position of a disk arm in each disk drive storage device to define a new segment.

27. A data storage system as defined in claim 26, wherein the control processor performs a garbage collection process by moving live data blocks of segment-columns in a target segment to a temporary storage buffer, wherein a live data block corresponding to the current arm position is moved if the arm position indicates that the disk arm has been idle for a time greater than a predetermined idle threshold time.

28. A data storage system as defined in claim 27, wherein the control processor further performs the garbage collection process if the disk arm that has been idle for a time greater than the predetermined idle threshold time is located on a segment-column that is part of a segment having less than a predetermined percentage of live data blocks.

29. A data storage system as defined in claim 27, wherein the control processor further performs the garbage collection process if the disk arm that has been idle for a time greater than the predetermined idle threshold time is located on a segment-column that has less than a predetermined percentage of live data blocks.

30. A data storage system as defined in claim 27, wherein the control processor further performs the garbage collection process if the disk arm that has been idle for a time greater than the predetermined idle threshold time is located on a segment-column that is part of a segment having less than a predetermined first percentage of live data blocks; and if the disk arm is located on a segment-column that has less than a predetermined second percentage of live data blocks.

31. A data storage system as defined in claim 27, wherein the control processor further performs the garbage collection process if the disk arm that has been idle for a time greater than the predetermined idle threshold time is located on a first segment-column of a first segment having less than a predetermined first percentage of live data blocks, and if a second segment-column on that same disk is the closest segment-column less than a predetermined number of segment-columns away, and if the second segment-column has less than a predetermined second percentage of live data blocks, wherein the live data blocks are moved from the second segment-column.

32. A data storage system as defined in claim 27, wherein the control processor further performs the garbage collection process by locating the segment number having the largest number of empty blocks, moving the idle disk arm to the corresponding segment-column, and proceeding with garbage collection in that segment-column.

33. A data storage system as defined in claim 24, wherein the control processor performs a garbage collection process by moving live data blocks of segment-columns in the target segment to a temporary storage buffer, wherein the data storage system moves the disk arm to the target segment-column from a present location and moves the corresponding live data blocks if the target segment-column has less than a predetermined percentage of live data blocks and if the present location of the disk arm is less than a predetermined number of segment-columns from the target segment-column.

34. A data storage system as defined in claim 24, further including:
an arm position table containing disk arm position data that indicates relative disk position for a disk arm of each disk drive storage device.

35. A data storage system as defined in claim 24, wherein the control processor performs a garbage collection process by moving live data blocks of segment-columns in a target segment to a temporary storage buffer, wherein the live data blocks are moved from the target segment-column if the number of empty segments in the log structured array falls below a predetermined number.

36. A program storage device readable by a machine, tangibly embodying a program of instructions executable by the machine to perform method steps for storing data as segments in a log structured array having a plurality of data storage devices in response to requests received from a host computer for data read and write operations into the data storage devices, the method steps performed by the machine comprising:
recording data received from the host computer into a write buffer;
determining disk arm position data that indicates position of a disk arm of each data storage device;
maintaining a log structured array (LSA) directory data structure that contains disk locations that define segments of the data storage devices comprising log structured array segments;
recording data in the write buffer into segments of the data storage devices when the write buffer becomes full, such that the segments into which data is written are dynamically defined according to which segment-columns are nearest to a present disk arm position; and
maintaining a segment definition table that indicates a data storage device location corresponding to the segment-columns that define each segment.

37. A program storage device as defined in claim 36, wherein the machine performed method step of recording data into segments of the data storage devices comprises selecting a segment-column for recording according to the segment-column nearest a current position of each disk drive storage device to form a new segment.

38. A program storage device as defined in claim 36, wherein the machine performed method steps further include the step of:
performing a garbage collection process by moving live data blocks of segment-columns in a target segment to a temporary storage buffer, wherein a live data block corresponding to the current arm position is moved if the current disk arm position data indicates that the disk arm has been idle for a time greater than a predetermined idle threshold time.

39. A program storage device as defined in claim 38, wherein the step of garbage collection is performed if the disk arm that has been idle for a time greater than the predetermined idle threshold time is located on a segment-column that is part of a segment having less than a predetermined percentage of live data blocks.

40. A program storage device as defined in claim 38, wherein the step of garbage collection is performed if the disk arm that has been idle for a time greater than the predetermined idle threshold time is located on a segment-column that has less than a predetermined percentage of live data blocks.

41. A program storage device as defined in claim 38, wherein the step of garbage collection is performed if the disk arm that has been idle for a time greater than the predetermined idle threshold time is located on a segment-column that is part of a segment having less than a predetermined first percentage of live data blocks; and if the disk arm is located on a segment-column that has less than a predetermined second percentage of live data blocks.

42. A program storage device as defined in claim 38, wherein the step of garbage collection is performed if the disk arm that has been idle for a time greater than the predetermined idle threshold time is located on a first segment-column of a first segment having less than a predetermined first percentage of live data blocks, and if a second segment-column on that same disk is the closest segment-column less than a predetermined number of segment-columns away, and if the second segment has less than a predetermined second percentage of live data blocks, wherein garbage collection is performed to move live data blocks from the second segment-column.

43. A program storage device as defined in claim 38, wherein the step of garbage collection is performed if the disk arm that has been idle for a time greater than the predetermined idle threshold time is located in a segment having the largest number of empty blocks in the array, and in a corresponding segment-column in that segment.

44. A program storage device as defined in claim 36, wherein the machine performed method steps further include the step of:

performing a garbage collection process by moving live data blocks of segment-columns in the target segment to a temporary storage buffer, wherein the controller moves the disk arm to the target segment-column from a present location and moves the corresponding live data blocks if the target segment-column has less than a predetermined percentage of live data blocks and if the present location of the disk arm is less than a predetermined number of segment-columns from the target segment-column.

45. A program storage device as defined in claim 36, further including the step of performing a garbage collection process by moving live data blocks of segment-columns in the target segment to a temporary storage buffer, wherein the controller moves the live data blocks from the target segment-column if the number of empty segments in the log structured array falls below a predetermined number.

* * * * *